UNITED STATES PATENT OFFICE.

HARRY T. BELLAMY, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF MAKING COLORED GLASS.

1,271,652.  Specification of Letters Patent.  Patented July 9, 1918.

No Drawing.  Application filed February 5, 1917. Serial No. 146,705.

*To all whom it may concern:*

Be it known that I, HARRY T. BELLAMY, a citizen of the United States, residing at Chicago, in the county of Cook and State of Illinois, have invented certain new and useful Improvements in Methods of Making Colored Glass, of which the following is a full, clear, concise, and exact description.

This invention relates to a method of making colored glass, and more particularly to the manufacture of ruby colored glass in which in the best known and commonest used processes gold is used for coloring material.

The principal object of this invention is to cheapen the process without deterioration of the product, by means of a reduction in the amount of gold required to satisfactorily color a given glass forming batch.

In accordance with the general features of this invention, the amount of gold required to satisfactorily color a given glass forming batch is reduced to a minimum by the introduction into the batch of tin oxid and a subsequent specific heat treatment of the batch.

The specific combination of the constituents of the glass forming batch hereinafter set forth is also believed to be novel.

The invention as hereinafter described may be readily utilized for producing glass of substantially any color, but is especially beneficial in the production of ruby colored glass. The introduction of the tin oxid into the glass batch serves to decrease the amount of coloring matter necessary to obtain a desired depth of color in the glass. As the more satisfactory forms of ruby colored glass are colored by the addition of gold, the reduction in the amount of this coloring matter for the production of ruby glass results in a marked economy, and consequently this invention is of maximum benefit in the production of ruby glass.

The following description will consequently be confined to the method utilized for the production of ruby colored glass, but obviously the invention is not limited to the production of ruby colored glass, but is applicable to the production of all types of colored glass in which tin oxid is used in connection with the glass forming silicates, as hereinafter described.

The term ruby glass is applied to red glass colored by the use of copper, gold, selenium, and, in some cases, flowers of sulfur, the color of the glass varying very considerably in intensity and shade. The best ruby colored glass is obtained by the use of gold, the other substances enumerated above producing a glass having a color which is so dense that if the glass is of any material thickness, very little if any light will penetrate through it. For this reason the gold process is almost universally used when ruby glass having the required depth and uniformity of color is desired, and in the following description the invention will be applied to the production of colored glass by means of the gold process.

Generally speaking, glass consists of a mixture of two or more silicates united by fusion into a homogeneous, hard, brittle mass. Silica or sand usually predominates combined with the bases potash, soda, lime, lead, etc. Oxids and other materials are frequently used as auxiliaries to impart colors or otherwise alter the physical properties of the glass. There are eight classes of glass silicates in which silica is combined with some or all of the above-mentioned bases. A silicate of sodium or potassium containing a large percentage of lead is known as strass. This particular type of glass varies from colorless glass to a slightly straw colored glass if the percentage of lead is high, said color being due to the lead silicate. Strass glass is the only kind of glass which can be combined with gold to produce a ruby color. Glass made in accordance with this invention consists of a glass batch containing the following ingredients given in percentage by weight:

| | |
|---|---|
| Sand | 36.30 |
| Red lead | 36.30 |
| Nitrate of soda | 16.00 |
| Oxid of antimony | 1.70 |
| Borax | 1.70 |
| Oxid of tin | 3.075 |
| Potash | 4.60 |
| Lime | 0.30 |
| Gold (10 K) | 0.025 |

These percentages may be slightly varied and satisfactory results obtained, although the preferred percentages above enumerated give the most satisfactory deep ruby transparent color. Gold is added to this glass batch as gold chlorid. This gold is added to the batch by dissolving 10 carat gold in aqua regia, which solution is stirred into the silica or sand, and in this way the gold chlorid is intimately incorporated in the batch.

The sand, red lead, nitrate of soda, oxid of antimony, borax, oxid of tin, potash, lime, and gold, which comprise the batch are then placed in a pot and heated to a very high temperature, about 2,400 degrees Fahrenheit, which causes them to undergo a violent chemical reaction. This chemical reaction results in the forming of complex silicates and the liberation of gases not needed in the compounds. When the chemical reaction has been completed and the evolved gases expelled from the hot solution transparent, viscous glass is formed. This transparent, viscous glass is strass glass holding in suspension gold and tin which have the potentiality of giving to said glass the ruby color if properly treated as hereinafter described. During the chemical reaction the gold chlorid has been dissociated, leaving finely divided gold distributed throughout the glass. A sample of the hot glass gathered from the pot at this stage of the operation is the color of strass glass, varying from a colorless to a slightly straw color. This glass is then allowed to cool, after which it is reheated to plasticity at which time the color, due to the gold, develops, varying in intensity from a rose color to a dark ruby, depending upon the amount of gold present.

Various theories have been advanced to explain why finely divided gold homogeneously dissolved in glass assumes a ruby color under certain conditions. Ultra-microscopic tests show that on reheating the gold is converted into the colloidal form of red gold hydrosol. Another theory is that on cooling glass quickly the gold separates out in particles of the magnitude of amicrons which are too small to reflect light and which by reheating, until the glass becomes soft, grow until they attain the size of ultra-microns which reflect the ruby color. As the ruby color is light reflected by particles of gold, the depth of color depends upon the amount of gold dissolved. In the well-known method of making ruby glass without the use of tin oxid one ounce of gold will produce the proper ruby color in sixty pounds of glass, the glass without the gold being transparent and reflecting no light. By reducing the transparency of the glass it was discovered that less gold would be needed, and the transparency of the glass was most efficiently and satisfactorily reduced by the addition of oxid of tin. A general law that a reduction in the transparency of the glass will reduce the amount of coloring matter required to color the glass any particular color desired seems to be substantiated by the experiments which have been conducted in connection with ruby, green, and other colors. The oxid of tin added to the batch remains in suspension in the glass, producing opalescence, that is, the glass has a frosty straw colored appearance, and this opalescence assists in the reflection of the ruby color by the particles of gold to such an extend that one-fifth of the original amount of gold above referred to, with the proper amount of tin oxid added, gives the desired depth of ruby color. The tin oxid in addition to reducing the quantity of gold required also materially increases the strength and reduces the brittleness of the glass, which eliminates the usual annealing operation which is regularly performed on glass, the glass containing the tin oxid having a toughness equal to that of the ordinary run of glass which has been annealed.

Further, since the quantity of gold necessary to be carried in suspension to obtain the necessary depth of color is greatly decreased, the tendency of the glass to vary in color from the top to the bottom of the mixing and heating pot is very much lessened. The small amount of gold used in the improved process results in a more equalized distribution thereof through the mass of glass in the pot during the melting operation, said amount of gold being so minute that it has very little tendency to settle in the bottom of the pot. With larger quantities of gold, since the specific gravity of the gold is considerably greater than the mass of the batch, the gold tends to settle in the bottom of the pot and an unequal distribution of color through the mass in the pot results.

This equal distribution of the gold through the mass in the new process in which tin oxid is used permits of the successful manufacture of very small quantities of ruby glass. Quantities as small as ten pounds have been successfully made, in which the glass has a very uniform color; whereas in the old process, in which the tin oxid is not used, satisfactory ruby glass could not be made in batches of less than 200 to 300 pounds. The improved process of making glass as hereinbefore described therefore results in a more economical production of a much better glass which has a greater uniformity of color.

Obviously this invention is not limited to the preferred method or article hereinbefore described, but is applicable to the production of all colors of glass, the production of which is included within the spirit and scope of the invention, as set forth in the appended claims.

What is claimed is:

1. The process of making ruby colored glass, which consists in mixing a glass forming batch containing tin and gold with the usual glass forming silicates, heating said batch to substantially 2,400 degrees Fahrenheit, cooling said batch, and finally reheating it to plasticity.

2. The hereinbefore described process of making ruby colored glass, which consists in combining sand, red lead, nitrate of soda oxid of antimony, borax, oxid of tin, potash, lime, and gold in proportions substantially as hereinbefore described.

3. The hereinbefore described process of making ruby colored glass, which consists in making a batch of sand, red lead, nitrate of soda, oxid of antimony, borax, oxid of tin, potash, lime and gold in proportions substantially as hereinbefore described, heating said batch to substantially 2,400 degrees Fahrenheit, then cooling said batch, and finally reheating it to plasticity.

In witness I hereunto subscribe my name this 26th day of January, A. D., 1917.

HARRY T. BELLAMY.